(12) United States Patent
Puglisi et al.

(10) Patent No.: US 6,329,319 B1
(45) Date of Patent: Dec. 11, 2001

(54) SEED COATING COMPOSITIONS FOR LOW TEMPERATURE APPLICATIONS

(75) Inventors: Christine Puglisi, Mountainside, NJ (US); Jacob J. Guth, Upper Black Eddy, PA (US)

(73) Assignee: National Starch and Chemical Investment Holding Corporation, New Castle, DE (US)

( * ) Notice: Subject to any disclaimer, the term of this patent is extended or adjusted under 35 U.S.C. 154(b) by 0 days.

(21) Appl. No.: 09/382,434

(22) Filed: Aug. 25, 1999

(51) Int. Cl.$^7$ ..................................................... A01N 25/26
(52) U.S. Cl. ................................................. 504/100
(58) Field of Search ............................................. 504/100

(56) References Cited

U.S. PATENT DOCUMENTS

| | | | |
|---|---|---|---|
| 3,113,399 | 12/1963 | Eversole et al. | 47/1 |
| 3,598,565 | 8/1971 | Graves | 71/77 |
| 4,169,902 | 10/1979 | De Long | 427/4 |
| 4,272,417 | 6/1981 | Barke et al. | 260/22 R |
| 4,729,190 * | 3/1988 | Lee | 47/57.6 |
| 5,129,180 * | 7/1992 | Stewart | 47/57.6 |
| 5,849,320 | 12/1998 | Turnblad et al. | 424/410 |
| 5,876,739 | 3/1999 | Turnblad et al. | 424/408 |
| 6,199,318 * | 3/2001 | Stewart et al. | 47/57.6 |

OTHER PUBLICATIONS

Peyser, P. "Glass Transition Temperatures of Polymers". In Polymer Handbook, 3rd ed. Brandrup et al, ed. John Wiley & Sons. pp. VI/209–258,1989.*

Schneider, Hans Adam. "Glass Transition ". In Polymeric Materials Encyclopedia, Joseph C. Salamone, ed., vol. 4, pp. 2777–2789, 1996.*

* cited by examiner

*Primary Examiner*—S. Mark Clardy
(74) *Attorney, Agent, or Firm*—Thomas F. Roland

(57) ABSTRACT

A seed coating composition for low temperature applications, said seed coating composition comprising at least one polymer having a Tg of $-60°$ C. to $20°$ C., provided that the Tg of the polymer is less than or equal to the seed surface temperature at the time of application. The seed coating compositions of the invention provide a matrix which entraps active ingredients and improves seedling survival by maintaining the active ingredient on the surface of the seed for a period of time. The seed coating also increases the safety of using an active ingredient by reducing operator exposure and environmental release. In addition, the seed coating composition is resistant to cracking and flaking even when the seed coating composition is applied at a temperature of less than $20°$ C. Moreover, the seed coating composition improves the uniformity of seed size and shape which is advantageous to mechanical planting techniques.

22 Claims, No Drawings

SEED COATING COMPOSITIONS FOR LOW TEMPERATURE APPLICATIONS

FIELD OF THE INVENTION

This invention relates to seed coating composition comprising at least one polymer having a Tg of −60° C. to 20° C., provided that the Tg of the polymer is less than or equal to the seed surface temperature at the time of application.

BACKGROUND OF THE INVENTION

Commercial farming depends upon the use of seeds which have excellent germination and high resistance to soil, air, and water borne diseases. Seed coatings which contain a pesticide, fungicide, or other active ingredient and a polymer to hold the active ingredient on the seed, are commonly applied to the surface of seeds to protect the seeds from fungal infestation, pest insects, etc.

Among the polymers described in the prior art are acrylics, modified polyacrylamide, and vinyl acrylic emulsions in U.S. Pat. No. 4,272,417; acrylic resin in U.S. Pat. No. 3,113,399; an aqueous emulsion of 10 to 60 percent by weight (% by wt) of a (i) water soluble neutralized copolymer of acrylic acid (AA) or methacrylic acid (MAA) and a lower acrylate, and (ii) a crosslinked copolymer of vinyl acetate and a lower alkyl acrylate, in U.S. Pat. No. 3,598,565; and, a mixture of a carboxylated hydrophilic acrylic copolymer, a crosslinking agent for the carboxy of the copolymer, an ultra-violet light absorber, and an animal or bird repellent, in U.S. Pat. No. 4,169,902. U.S. Pat. No. 5,849,320 describes insecticidal coatings for seeds which contain one or more binders selected from polymers and copolymers of polyvinyl acetate, methyl cellulose, polyvinyl alcohol, vinylidene chloride, acrylic, cellulose, polyvinylpyrrolidone and polysaccharide and a pesticide, wherein the binder forms a matrix for the pesticide. U.S. Pat. No. 5,876,739 describes insecticidal coatings for seeds containing a binder prepared from polymers or copolymers, and filler, wherein the binder forms a matrix for the pesticide and filler resulting in a substantially non-phytotoxic seed coating.

The desirable properties of the polymer used in the coating are that the polymer: (a) adheres effectively to the seed surface while providing a smooth and uniform seed coating; (b) resists hydration at high humidity; (c) results in a flexible coating which will not be friable during bagging and planting of the seeds; (d) does not allow the generation of dust during processing of the seeds; (e) is non-flammable; (f) has some degree of glycerol or ethylene glycol solubility to permit treating seeds at sub-zero temperatures; (g) is capable of forming a relatively low viscosity solution; (h) does not generate seed aggregates during the coating process; (i) allows seed treating throughput of at least 100 bushels/hr.; (j) is permeable to both water and oxygen; and, (k) can be easily washed off processing equipment when deposited thereon during treating of the seeds with the seed coating formulation, or when planting the treated seeds.

A major concern of the seed coating process is the temperature at which the coating is applied to the seeds. For example, seeds harvested in the fall are normally coated during the winter months when temperatures are low in order to be ready for spring planting. At such low temperatures, typically less than 20° C., polymers having a Tg>20° C. have a tendency to form discontinuous films which exhibit cracking and flaking. This problem is made worse by the rubbing action of the seeds during bagging, transportation, and handling processes, particularly when such seeds are coated at low temperatures. These seed coatings which are friable or flake off sacrifice protection of the seed and cause dust. Moreover, since many active ingredients in the seed coating compositions tend to be injurious to humans and to the environment, "dusting" of coated seeds during handling and planting is particularly to be avoided.

It would be advantageous to develop a seed coating composition which strongly adheres to seeds and provides a uniform coating on seeds that is resistant to cracking and flaking even during handling and transportation of the seeds, when the seed coating composition is applied at a temperature of less than 20° C.

SUMMARY OF THE INVENTION

The invention provides a seed coating composition for low temperature applications, said seed coating composition comprising at least one polymer having a Tg of −60° C. to 20° C.

According to another aspect the invention provides a seed coated with a seed coating composition comprising at least one polymer having a Tg of −60° C. to 20° C., provided that the Tg of the polymer is less than or equal to the seed surface temperature at the time of application.

According to another aspect the invention provides a method for preparing a coated seed comprising: a) mixing at least one active ingredient with at least one polymer having a Tg of −60° C. to 20° C.; b) applying the mixture to a seed wherein the Tg of the polymer is less than or equal to the seed surface temperature; and c) allowing the mixture to dry on said seed.

According to another aspect the invention provides a method for protecting emerging seedlings of a crop plant comprising applying to the seeds of the crop plant a seed coating composition comprising at least one active ingredient and at least one polymer having a Tg of −60° C. to 20° C., provided that the Tg of the polymer is less than or equal to the seed surface temperature at the time of application.

The seed coating compositions of the invention provide a matrix which entraps active ingredients and improves seedling survival by maintaining the active ingredient on the surface of the seed for a period of time. The seed coating also increases the safety of using an active ingredient by reducing operator exposure and environmental release. In addition, the seed coating composition is resistant to cracking and flaking even when the seed coating composition is applied at a temperature of less than 20° C. Moreover, the seed coating composition improves the uniformity of seed size and shape which is advantageous to mechanical planting techniques.

DESCRIPTION OF THE INVENTION

Virtually any seed can be treated with the seed coating composition of the invention, such as cereals, vegetables, ornamentals, and fruits. Preferably the seeds are selected from the group of corn (sweet and field), soybean, wheat, barley, oats, rice, cotton, sunflower, alfalfa, sorghum, rapeseed, sugarbeet, canola, tomato, lima beans and other beans, lentils, peas, sunflowers, lettuce, carrot, tobacco and flower seed, for example, pansy, impatiens, petunia and geranium. The most preferred seeds to be coated with the seed coating composition are those seeds which are generally treated at temperatures of less than 20° C., e.g. corn, canola, sugarbeet, wheat, soybean, beans, and peas.

The seed coating compositions contains at least one polymer, and optionally an active ingredient. The polymer has a Tg of −60° C. to 20° C., preferably −40° C. to 10° C., more preferably −20° C. to 10° C., most preferably −10° C. to 10° C. The inventors have determined that the seed coating compositions of the invention provide a uniform coating on seeds which is resistant to cracking and flaking even when the seed coating composition is applied at a temperature of less than 20° C. The inventors have also determined that seeds coated with polymers having a Tg greater than 20° C. typically form a discontinuous film on the seeds. The film exhibits cracking and flaking when applied to seeds at a temperature less than 20° C. In addition, the inventors have determined that seeds coated with polymers having a Tg less than −60° C. typically form sticky or tacky films which build up on equipment and restrict the operation thereof unless removed.

A variety of polymers can be used to prepare the seed coating of the invention, for example, proteins, polysaccharides, polyesters, polyurethanes, polymers prepared from unsaturated monomers, and combinations thereof. The polymer should be capable of drying and forming a film. As used herein, "polymer" includes copolymers, terpolymers, etc.

Preferably, the polymer is prepared from at least one ethylenically unsaturated monomer. Suitable ethylenically unsaturated monomers are anhydrides, vinyl esters, alpha-olefins, alkyl esters of acrylic and methacrylic acid, substituted or unsubstituted mono and dialkyl esters of unsaturated dicarboxylic acids, vinyl aromatics, unsubstituted or substituted acrylamides, cyclic monomers, monomers containing alkoxylated side chains, sulfonated monomers, vinyl amide monomers, $\alpha,\beta$-ethylenically unsaturated $C_3$–$C_8$ monocarboxylic acids, $\alpha,\beta$-ethylenically unsaturated $C_4$–$C_8$ dicarboxylic acids, including the anhydrides thereof, and the $C_4$–$C_8$ alkyl half esters of the $\alpha,\beta$-ethylenically unsaturated $C_4$–$C_8$ dicarboxylic acids. A combination of ethylenically unsaturated monomers may also be used.

Suitable anhydride monomers are, for example, maleic anhydride and itaconic anhydride. Suitable vinyl esters are, for example, vinyl acetate, vinyl formate, vinyl propionate, vinyl butyrate, vinyl isobutyrate, vinyl valerate, vinyl 2-ethyl-hexanoate, vinyl isooctanoate, vinyl nonanoate, vinyl decanoate, vinyl pivalate, and vinyl versatate. Suitable alkyl esters of acrylic and methacrylic acid are, for example, methyl acrylate, methyl methacrylate, ethyl acrylate, ethyl methacrylate, propyl acrylate, butyl acrylate, pentyl acrylate, hexyl acrylate, and 2-ethyl hexyl acrylate, etc. Suitable substituted or unsubstituted mono and dialkyl esters of unsaturated dicarboxylic acids are, for example, substituted and unsubstituted mono and dibutyl, mono and diethyl maleate esters as well as the corresponding fumarates.

Suitable vinyl aromatic monomers preferably contain from 8 to 20 carbon atoms, most preferably from 8 to 14 carbon atoms. Examples of vinyl aromatic monomers are styrene, 1-vinyl naphthalene, 2-vinyl naphthalene, 3-methyl styrene, 4-propyl styrene, t-butyl styrene, 4-cyclohexyl styrene, 4-dodecyl styrene, 2-ethyl-4-benzyl styrene, 4-(phenylbutyl) styrene, 3-isopropenyl-α, α-dimethylbenzyl isocyanate, and halogenated styrenes.

Suitable acrylamide based monomers are, for example, acrylamide, N, N-dimethylacrylamide, N-octyl acrylamide, N-methylol acrylamide, dimethylaminoethylacrylate, etc. Suitable cyclic monomers are, for example, vinyl pyrrolidone, vinyl imidazolidone, vinyl pyridine, etc. Suitable sulfonated monomers are, for example, 2-acrylamido-2-methyl propane sulfonic acid, sodium methallyl sufonate, sodium vinyl sulfonate, sulfonated sytrene, etc. Suitable vinyl amide monomers are, for example, N-vinyl formamide, N-vinyl acetamide, etc.

In a preferred embodiment of the invention, the polymer is a copolymer of an acrylate monomer, such as butyl acrylate, and vinyl acetate or ethylene and vinyl acetate.

Optionally, at least one active ingredient is combined with the polymer prior to application of the polymer onto the seed. As used herein, "active ingredient" means an ingredient which serves to aid or contribute to the germination of the seed and growth of the seedling. Typical active ingredients include pesticides, fungicides, nematocides, rodenticides, bird repellants, herbicides, miticides, insecticides, growth regulators, plant nutrients, genetic switches such as for cold protection or draught protection, and the like. Particular active ingredients commonly used are CAPTAN, APRON, SEVIN, VITAVAX, a carboxin, MAGNUM, methoxychlor, TBZ, PARATHION, THIRAM, malathion, mesurol, ammonium nitrate, tetramethylthiuram disulfide, and plant hormones. The active ingredient may diffuse through the film formed by the polymer to the surrounding medium.

Examples of pesticides include those selected from pyrethoids, organophosphates, caramoyloximes, pyrazoles, amidines, halogenated hydrocarbons, and carbamates and derivatives thereof. Particularly suitable classes of pesticides include organophosphates, phenylpyrazoles and pyrethoids. Preferred pesticides are those know as terbufos, chlorpyrifos, fipronil, chlorethoxyfos, tefluthrin, carbofuran, imidacloprid, and tebupirimfos. Also included are insect growth regulators for example, methoprene and hydroprene.

It is within the scope of the invention to prepare a polymer having a Tg outside of the critical range of −60° C. to 20° C., provided that prior to coating a seed with a seed coating composition containing the polymer, the Tg of the polymer is adjusted to within the critical range of −60° C. to 20° C. A preferred means of adjusting the Tg of a polymer is with one or more plasticizers. Examples of plasticizers are glycerin, ethylene glycol, propylene glycol, and esters such as 2-ethyl hexyl phthalate.

The polymer is prepared using polymerization methods which are known in the art such as emulsion polymerization, inverse emulsion polymerization, solution polymerization, etc. Batch or continuous monomer addition or incremental monomer addition processes may be used. Although the solids content of the polymer can vary, the percent solids of the polymer is preferably in the range of from about 40 to about 70 weight percent, more preferably from about 50 to about 60 weight percent.

In a preferred embodiment, the polymer is an aqueous emulsion polymer prepared with one or more surfactants or emulsifiers such as anionic and/or nonionic surfactants. The type and amount of surfactants are known in the art. However, a surfactant is not necessary to prepare the polymers of the invention. Anionic surfactants include, for example, from $C_8$ to $C_{12}$ alkylbenzenesulfonates, from $C_{12}$ to $C_{16}$ alkanesulfonates, from $C_{12}$ to $C_{16}$ alkylsulfates, from $C_{12}$ to $C_{16}$ alkylsulfosuccinates or from $C_{12}$ to $C_{16}$ sulfated ethoxylated alkanols. Nonionic surfactants include, for example, from $C_6$ to $C_{12}$ alkylphenol ethoxylates, from $C_{12}$ to $C_{20}$ alkanol alkoxylates, and block copolymers of ethylene oxide and propylene oxide. The nonionic surfactants also include $C_4$ to $C_{18}$ alkyl glucosides as well as the alkoxylated products obtainable therefrom by alkoxylation, particularly those obtainable by reaction of alkyl glucosides with ethylene oxide. A combinations of surfactants may be used in preparing the polymer.

Water-soluble or water-dispersible polymerizable surfactants may also be used alone or in combination with non-polymerizable surfactant(s) to prepare the polymer. A preferred polymerizable surfactant for preparing the polymer is an allyl amine salt of alkyl benzene sulfonate denoted Structure I:

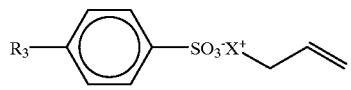

In Structure I, $R_3$ is an alkyl group having 1 to 20 carbon atoms, preferably 10 to 18 carbon atoms; and X+ is selected from $NH_3^+$, $NH_2R_6$ or $NR_6R_7$ wherein $R_6$ and $R_7$ are independently $C_1$–$C_4$ alkyl or hydroxyalkyl groups. Most preferably, the allyl amine salt of alkyl benzene sulfonate is allyl amine salt of dodecylbenzene sulfonate.

Another preferred polymerizable surfactant is an allyl amine salt of alkyl ether sulfate denoted Structure II:

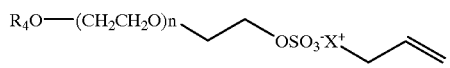

In Structure II, $R_4$ is an alkyl group having 1 to 20 carbon atoms, preferably 10 to 18 carbon atoms; n is an integer from 2 to 15, and $X^+$ is selected from $NH_3^+$, $NH_2R_6$ or $NR_6R_7$ wherein $R_6$ and $R_7$ are independently $C_1$–$C_4$ alkyl or hydroxyalkyl groups. Most preferably, the allyl amine salt of alkyl ether sulfate is allyl amine salt of laureth sulfate.

Another preferred polymerizable surfactant is an allyl amine salt of a phosphate ester denoted Structure III:

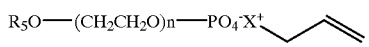

In Structure III, $R_5$ is an alkyl group having 1 to 20 carbon atoms, preferably 10 to 18 carbon atoms; n is an integer from 2 to 15, and $X^+$ is selected from $NH_3^+$, $NH_2R_6$ or $NR_6R_7$ wherein $R_6$ and $R_7$ are independently $C_1$–$C_4$ alkyl or hydroxyalkyl groups. Most preferably, the allyl amine salt of a phosphate ester is allyl amine salt of nonyl phenol ethoxylate (9 moles EO) phosphate ester. Preferred polymerizable surfactants are available under the trademarks POLYSTEP AU1, POLYSTEP AU7 and POLYSTEP AU9 from Stepan Company.

Depending upon the particular seed to be coated, the conditions under which it is to be stored, and the soil and weather conditions under which it is expected to germinate and grow, the seed coating composition may include a wide spectrum of one or more additives. Such additives include, but are not limited to, pigments, dyes, extenders such as flour, dispersing agents, excipients, anti-freezing agents, preservatives, herbicidal safeners, fertilizers, biocontrol agents, surfactants, sequestering agents, plasticizers, colorants, brighteners, emulsifiers, flow agents such as calcium stearate, talc and vermiculite, coalescing agents, defoaming agents, humectants, thickeners, waxes, bactericides, insecticides, pesticides, and fillers such as cellulose, glass fibers, clay, kaolin, talc, calcium carbonate and wood meal, and odor-modifying agents. Typical excipients include finely divided mineral substances such as pumice, attapulgite, bentonite, kaoline zeolite, diatomite, and other clays, modified diatomaceous adsorbents such as MICROCEL E, charcoal, vermiculite, finely divided organic substances such as peat moss, wood powder, and the like.

The concentration of the polymer in the seed coating composition is from 0.01 to 10 weight percent, based on the total weight of the seed coating composition. Preferably the concentration of the polymer in the seed coating composition is from 0.1 to 5 weight percent.

The coated seeds may vary widely in size ranging from the very small, for example celery seeds, to the very large, for example peanuts which may be coated with thin single layer coatings from about 0.010 mm to about 0.5 mm thick, to thicker multilayer coatings from about 0.5 mm to about 2 mm thick.

The seed coating composition is preferably distributed on the surface of the seed in a substantially uniform manner. Suitable means of applying the seed coating composition on seeds is by various methods known to those skilled in the art. Three well known techniques include the use of drum coaters, rotating bowl or HEGE seed coater, and vortex or NIKLAS coaters. The seeds may be presized prior to coating.

A film overcoating can be optionally applied to the coated seeds of the invention. The film overcoat may protect the coating layers, and/or allow for easy identification of the treated seeds, and/or function to increase the bulk or uniformity of the seed coating.

Various materials are suitable for overcoating including but not limited to, methyl cellulose, hydroxypropylmethylcellulose, dextrin, gums, waxes, vegetable or paraffin oils; water soluble or water disperse polysaccharides and their derivatives such as alginates, starch, and cellulose; and synthetic polymers such as polyethylene oxide, polyvinyl alcohol and polyvinylpyrrolidone and their copolymers and related polymers including mixtures of such polymers. The overcoat, if present, may optionally include any additives such as those previously mentioned.

The following nonlimiting examples illustrate further aspects of the invention.

EXAMPLE 1

An ethylene/vinyl acetate copolymer was prepared by aqueous emulsion polymerization which contained 84% vinyl acetate and 14% ethylene. The copolymer was determined to have a Tg of 0° C.

EXAMPLE 2

An ethylene/vinyl acetate copolymer was prepared by aqueous emulsion polymerization which contained 90% vinyl acetate and 10% ethylene. The copolymer was determined to have a Tg of 20° C.

EXAMPLE 3

A vinyl acetate homopolymer was prepared by aqueous emulsion polymerization. The copolymer was determined to have a Tg of 40° C.

EXAMPLE 4

An ethylenelvinyl acetate copolymer was prepared by aqueous emulsion polymerization which contained 71% vinyl acetate and 29% ethylene. The copolymer was determined to have a Tg of 15° C.

EXAMPLE 5

A butyl acrylatelvinyl acetate copolymer was prepared by aqueous emulsion polymerization which contained 48% butyl acrylate and 52% vinyl acetate. The copolymer was determined to have a Tg of −15° C.

EXAMPLE 6

A butyl acrylate/vinyl acetate copolymer was prepared by aqueous emulsion polymerization that contained 30% butyl acrylate and 70% vinyl acetate. The copolymer was determined to have a Tg of 8° C.

EXAMPLE 7

An ethyl acrylate/acrylonitrile/N-methylol acrylamide terpolymer was prepared by aqueous emulsion polymerization which contained 93% ethyl acrylate, 1% acrylonitrile, and 6% N-methylol acrylamide. The terpolymer was determined to have a Tg of −16° C.

EXAMPLE 8

A methyl methacrylate, butyl acrylate, methacrylic acid terpolymer was prepared by aqueous emulsion polymerization which contained 53% methyl methacrylate, 45% butyl acrylate, and 2% methacrylic acid. The terpolymer was determined to have a Tg of 13° C.

EXAMPLE 9

Preparation of seed coating composition.

A seed coating composition was prepared according to the following formulation: '67 weight percent emulsion polymer (55% solids) '10 weight percent propylene glycol '22 weight percent talc '0.5 weight percent dye '0.5 weight percent of TRITON X-100 (octylphenoxypolyethoxymethanol) available from Union Carbide.
Total=100 weight percent.

The above components were mixed in a beaker at room temperature until a homogenious mixture was obtained.

EXAMPLE 10

Application of seed coating composition on seeds.

The copolymer prepared in Example 1 having a Tg of 0° C. was used as the polymer in the seed coating composition of Example 9. The seed coating composition was applied to seeds by means of a HEGE seed coater at a temperature of 20° C. The copolymer was applied at a concentration of 0.2 weight percent, based on the total weight of the seed coating composition.

EXAMPLE 11

Application of Copolymer of Example 1 to seeds.

A scanning electron micrograph of a seed surface which was coated at a temperature of 10° C. and at a level of 1%, based on the weight of the seeds, with the copolymer prepared in Example 1 having a Tg of 0° C., shows that the copolymer displayed excellent adhesion to the seeds and formed a smooth continuous film on the seeds.

EXAMPLE 12

Application of Copolymer of Example 2 to seeds.

The copolymer prepared in Example 2 having a Tg of 20° C. was applied to seeds at a temperature of 10° C. The copolymer was applied at a concentration of 1 weight percent, based on the total weight of the seed used.

A scanning electron micrograph of a seed surface which was coated with the copolymer prepared in Example 2 at a temperature of 10° C. under the above conditions shows poor adhesion of the copolymer to the surface of the seed. In addition, the film was soft, and porous as evidenced by the many cracks in the film.

EXAMPLE 13

Application of seed coating composition on seeds.

Forty grams of corn seeds or cotton seeds were coated with approximately 1 gram of the seed coating composition prepared in Example 9 in which the Copolymers described in Examples 1–2 were used. A control 40 gram seed sample was coated with one gram of another seed coating formulation which contained no polymer. The seed coating formulation which was coated onto the corn seeds contained talc as a filler. The seed coating formulation which was coated onto the cotton seeds did not contain a filler.

The coated seeds were placed in a round bottom flask equipped with an air inlet and tumbled for five minutes on a roller bar apparatus at a rate of 60 rpm at 20° C. Filtered air was passed through the air inlet of the round bottom flask and then through a filter mounted on the far end of the vessel. The amount of "dust" particles that were removed from the seed coatings and collected onto the filter was then measured. The test results are summarized in Table I.

TABLE 1

Effects of Copolymer on Adhesive Properties of Seed Coating

| Treatment | mg of dust particles removed from seed coating |
|---|---|
| Corn seed with Copolymer prepared in Example 1. | 0.02 |
| Control (corn seed without polymer) | 11.58 |
| Cotton seed with Copolymer prepared in Example 2. | 0.19 |
| Control (cotton seed without polymer) | 3.78 |

The test results in Table I clearly show that the copolymers of the invention when used in a seed coating formulation significantly reduces the amount of fine particles that will be removed from a seed coating during handling.

EXAMPLE 14

The Copolymers prepared in Examples 1 and 2 were coated onto corn seeds at three different temperatures: 1° C., 4° C., and 10° C. The seeds, copolymer solutions, dispensing pipets, and coating jars were equilibrated to the coating temperatures. The copolymers were dispensed onto the seeds and the seeds agitated for 30 seconds. The coated seeds were then dried at the coating temperatures for 2 hours. Approximately 0.1 grams of polymer (dried weight) was deposited onto 10 grams of seed. After two hours, the coated seeds were agitated for 30 minutes at 20° C. (to simulate conditions typically encountered during handling and transit) and the amount of copolymer/coating that was dislodged from the seed surface was measured. The test results are summarized in Table II.

TABLE II

| | Coating Temperatures (° C.) | | |
|---|---|---|---|
| | 1° C. | 4° C. | 10° C. |
| Copolymer prepared in Ex. 1 (Tg = 0° C.) | 0.001 g | 0.001 g | 0.002 g |
| Copolymer prepared in Ex. 2 (Tg = 20° C.) | 0.054 g | 0.053 g | 0.041 g |

The test results in Table II clearly show that when the copolymers of the invention are applied at temperatures below their film forming temperatures (equivalent to Tg) the resultant film quality was very poor. With abrasion, a significant amount of the coating will be removed from the seed surface which most likely would result in poor germination of the treated seeds. However, when the copolymers of the invention were applied at a temperature greater than their film forming temperature, the resultant film quality was excellent, and even with the application of abrasion, the coating was not removed from the seed.

EXAMPLE 15

The Copolymers prepared in Examples 3 and 4 were coated onto corn seeds at three different temperatures: 1° C., 4° C., and 10° C. Polymers prepared in Examples 5, 6, 7, and 8 were coated onto corn seeds at 10° C. The seeds, copolymer solutions, dispensing pipets, and coating jars were equilibrated to the appropriate coating temperatures. The copolymer was dispensed onto the seeds and the seeds were agitated for 30 seconds. The coated seeds were then dried at the coating temperature for two hours. Approximately 0.1 grams of polymer (dried weight) was deposited onto 10 grams of seed. After drying, the coated seeds were agitated for 30 minutes at 20° C (to simulate conditions encountered during normal handling and transit) and the amount of copolymer/coating that was dislodged from the seed surface was measured. The test results are summarized in Table III.

TABLE III

| Polymer | Coating Temperatures | | |
|---|---|---|---|
| | 1° C. | 4° C. | 10° C. |
| Copolymer prepared in Example 3 (Tg = 0° C.) | 0.001 g | 0.001 g | 0.002 g |
| Copolymer prepared in Example 4 (Tg = 20° C.) | 0.054 g | 0.047 g | 0.049 g |
| Copolymer prepared in Example 5 (Tg = 20° C.) | — | — | 0.016 g |
| Copolymer prepared in Example 6 (Tg = −15° C.) | — | — | 0.0001 g |
| Terpolymer prepared in Example 7 (Tg = −16° C.) | — | — | 0.0000 g |
| Terpolymer prepared in Example 8 (Tg = 13° C.) | — | — | 0.0556 g |

The test results in Table III clearly show that when the polymers of the invention are applied at temperatures below their film forming temperatures (equivalent to Tg) the resultant film quality was very poor, and with abrasion, approximately half of such poor coatings were removed from the seed surface. Thus, in Examples 4, 5, and 8 were the polymers were applied at a temperature below their Tg, the resulting coatings displayed poor mechanical and adhesive properties.

While the invention has been described with particular reference to certain embodiments thereof, it will be understood that changes and modifications may be made by those of ordinary skill within the scope and spirit of the following claims.

What is claimed is:

1. A coated seed comprising a seed, having coated thereon a coating composition comprising an emulsion polymer having a Tg of −60° C. to 20° C., provided that the Tg of the polymer is less than or equal to the seed surface temperature at the time of application.

2. A method for preparing a coated seed comprising: a) preparing an emulsion polymer having a Tg of −60° C. to 20° C.; b) applying the polymer to a seed provided the Tg of the polymer is less than or equal to the seed surface temperature at the time of application; and c) allowing the polymer to dry on said seed.

3. The method for preparing a coated seed according to claim 2 wherein the Tg of the polymer prior to application is adjusted by the addition of one or more plasticisers.

4. A method for preparing a coated seed comprising: a) mixing at least one active ingredient with an emulsion polymer having a Tg of −60° C. to 20° C.; b) applying the mixture to a seed wherein the Tg of the polymer is less than or equal to the seed surface temperature at the time of application; and c) allowing the mixture to dry on said seed.

5. A method for protecting emerging seedlings of a crop plant comprising applying to the seeds of the crop plant a seed coating composition comprising an emulsion polymer having a Tg of −60° C. to 20° C., provided that the Tg of the polymer is less than or equal to the seed surface temperature at the time of application.

6. The coated seed according to claim 1 wherein the polymer has a Tg of −40° C. to 10° C.

7. The coated seed according to claim 6 wherein the polymer has a Tg of −20° C. to 10° C.

8. The coated seed according to claim 7 wherein the polymer has a Tg of −10° C. to 10° C.

9. The coated seed according to claim 1 wherein the polymer is selected from the group consisting of proteins, polysaccharides, polyesters, polyurethanes, polymers prepared from unsaturated monomers, and combinations thereof.

10. The coated seed according to claim 9 wherein the polymer is prepared from ethylenically unsaturated monomers.

11. The coated seed according to claim 10 wherein the ethylenically unsaturated monomer is selected from the group consisting of vinyl esters, α-olefins, anhydrides, alkyl esters of acrylic and methacrylic acid, substituted or unsubstituted mono and dialkyl esters of unsaturated dicarboxylic acids, vinyl aromatics, unsubstituted or substituted acrylamides, cyclic monomers, monomers containing alkoxylated side chains, sulfonated monomers, vinyl amide monomers, and combinations thereof.

12. The coated seed according to claim 11 wherein the vinyl esters are selected from the group consisting of vinyl acetate, vinyl formate, vinyl propionate, vinyl butyrate, vinyl isobutyrate, vinyl valerate, vinyl 2-ethyl-hexanoate, vinyl isooctanoate, vinyl nonanoate, vinyl decanoate, vinyl pivalate, and vinyl versatate.

13. The coated seed according to claim 11 wherein the alkyl esters are selected from the group consisting of methyl acrylate, methyl methacrylate, ethyl acrylate, ethyl methacrylate, propyl acrylate, butyl acrylate, pentyl acrylate, hexyl acrylate, and 2-ethyl hexyl acrylate.

14. The coated seed according to claim 11 wherein the substituted or unsubstituted mono and dialkyl esters of unsaturated dicarboxylic acids are selected from the group consisting of substituted and unsubstituted mono and dibutyl, mono and diethyl maleate esters, and the corresponding fumarates of such esters.

15. The coated seed according to claim 11 wherein the vinyl amide monomers are selected from the group consisting of N-vinyl formamide and N-vinyl acetamide.

16. The coated seed according to claim 11 wherein the vinyl aromatic monomer is selected from the group consisting of styrene, 1-vinyl naphthalene, 2-vinyl naphthalene, 3-methyl styrene, 4-propyl styrene, t-butyl styrene, 4-cyclohexyl styrene, 4-dodecyl styrene, 2-ethyl-4-benzyl styrene, and 4-(phenylbutyl) styrene.

17. The coated seed according to claim 11 wherein the ethylenically unsaturated monomer is selected from the group consisting of methylmethacrylate, butyl acrylate, 2-ethylhexyl acrylate, vinyl acetate, and combinations thereof.

18. The coated seed according to claim 11 wherein the ethylenically unsaturated monomer is selected from the group consisting of copolymers of acrylates and vinyl acetate and ethylene and vinyl acetate.

19. The coated seed according to claim 1 wherein the polymer is present in an amount of from 0.1 to 10 weight percent, based on the total weight of the seed coating composition.

20. The coated seed according to claim 19 wherein the polymer is present in an amount of from 1 to 5 weight percent, based on the total weight of the seed coating composition.

21. The coated seed according to claim 1 wherein the Tg of the polymer prior to application is adjusted by the addition of one or more plasticisers.

22. The coated seed according to claim 21 wherein the plasticiser is selected from the group consisting of glycerin, ethylene glycol, propylene glycol, and 2-ethyl hexyl phthalate.

* * * * *